United States Patent
Sung et al.

(10) Patent No.: US 8,492,051 B2
(45) Date of Patent: Jul. 23, 2013

(54) INTEGRATED VALVE SYSTEM FOR FUEL CELL STACK

(75) Inventors: Woo Suk Sung, Gyeonggi-Do (KR); Jae Jun Ko, Gyeonggi-Do (KR); Sae Hoon Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 703 days.

(21) Appl. No.: 12/623,724

(22) Filed: Nov. 23, 2009

(65) Prior Publication Data

US 2010/0323259 A1 Dec. 23, 2010

(30) Foreign Application Priority Data

Jun. 19, 2009 (KR) .................. 10-2009-0054955

(51) Int. Cl.
*H01M 8/04* (2006.01)

(52) U.S. Cl.
USPC .......................................... 429/512; 429/414

(58) Field of Classification Search
None
See application file for complete search history.

(56) References Cited

U.S. PATENT DOCUMENTS

| | | | |
|---|---|---|---|
| 2009/0325031 A1* | 12/2009 | Sugawara et al. | 429/34 |
| 2010/0021783 A1* | 1/2010 | Osada et al. | 429/25 |

FOREIGN PATENT DOCUMENTS

| | | | | |
|---|---|---|---|---|
| JP | 2000-193127 A | | 7/2000 | |
| JP | 2001-041039 A | | 2/2001 | |
| JP | 2003-148639 A | | 5/2003 | |
| JP | 2006153223 A | * | 6/2006 | |
| JP | 2006-236831 A | | 9/2006 | |
| JP | 2008-008286 A | | 1/2008 | |
| JP | 2008-020163 A | | 1/2008 | |
| JP | 2008-146951 A | | 6/2008 | |
| KR | 10-2006-0030212 A | | 4/2006 | |

* cited by examiner

*Primary Examiner* — Yelena G Gakh
(74) *Attorney, Agent, or Firm* — Edwards Wildman Palmer LLP; Peter F. Corless

(57) ABSTRACT

The present invention provides a novel integrated valve system for a fuel cell stack, in which an air shut-off valve for preventing the inflow of air when a fuel cell shuts down and a dry gas purge valve for improving cold startability are coaxially coupled to each other so that the air shut-off valve and the dry gas purge valve simultaneously open or close.

4 Claims, 12 Drawing Sheets

INTEGRATED VALVE SYSTEM FOR FUEL CELL STACK

CROSS-REFERENCE TO RELATED APPLICATION

This application claims under 35 U.S.C. §119(a) the benefit of Korean Patent Application No. 10-2009-0054955 filed Jun. 19, 2009, the entire contents of which are incorporated herein by reference.

BACKGROUND (a) Technical Field

The present disclosure relates, in general, to an integrated valve system for a fuel cell stack. More particularly, the present invention relates to a novel integrated valve system for a fuel cell stack, in which an air shut-off valve for suitably preventing the inflow of air when a fuel cell shuts down and a dry gas purge valve for suitably improving cold startability are coaxially coupled to each other so that the air shut-off valve and the dry gas purge valve simultaneously open or close.

(b) Background

The catalyst deterioration of a fuel cell stack occurs in the start-up and shut-down cycles of a fuel cell vehicle.

It has been reported that the catalyst deterioration of each electrode (cathode or anode) in the stack in the start-up and shut-down cycles of a fuel cell is larger than that in idling and loading cycles.

Preferably, in order to easily start up the fuel cell vehicle under conditions below the freezing point, water must be removed from the cathode of the fuel cell stack before the shut-down cycle is performed, to prevent it from freezing. As one method for removing the water, for example, a gas purge method using an air blower has been used. However, discharged water which is purged is re-circulated through a humidifier to the stack, so that water is not perfectly removed.

Another method for removing water has been proposed that preferably uses a dry air purge method for supplying only dry air from the air blower to the fuel cell stack. Preferably, a humidifier bypass valve is suitably installed at the inlet side of the humidifier to bypass wet gas when it tries to enter the cathode.

However, it is difficult to start because of a drop of cell voltage of the fuel cell resulting from the freezing of water remaining in the stack. Conversely, according to the dry air purge method of supplying only dry air, there is no drop of cell voltage resulting from the freezing of water remaining in the stack, so that it is possible to start it.

As such, conventionally, the air shut-off valve is suitably installed at each of the inlet side and outlet side of the cathode so as to prevent air (oxygen), which causes the catalyst to suitably deteriorate during the start process of the fuel cell, from entering the cathode, and the humidifier bypass valve is further installed at the humidifier inlet side to send wet gas entering the cathode to the humidifier. This is problematic in that it has difficulty in securing a valve mounting space, and a valve mounting structure is complicated.

Further, this has a drawback in that several valves must be additionally installed, so that manufacturing cost is considerably increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides an integrated valve system for a fuel cell stack, in which an air shut-off valve for suitably preventing air from entering a cathode when a fuel cell is shut down and a dry gas purge bypass valve for suitably removing water are preferably integrated into one module, thus preventing air from entering the cathode when the fuel cell is shut down to suitably prevent the deterioration of catalyst in the stack and increase the durability of the stack, and efficiently eliminating water to suitably improve cold startability.

In one preferred embodiment, the present invention provides an integrated valve system for a fuel cell stack preferably including an air shut-off valve for preventing air from entering a cathode when a fuel cell is shut down, and a bypass valve having a dry gas purging function to suitably remove water and an air blocking function. Preferably, the bypass valve is coaxially coupled to the air shut-off valve into one module so that the bypass valve and the air shut-off valve are suitably simultaneously opened or closed by a drive means.

In a preferred embodiment, the air shut-off valve may be a two-way valve and may preferably include a first housing provided in an air supply line between a humidifier outlet and a cathode inlet, and a first valve plate suitably rotatably provided in the first housing.

In another preferred embodiment, the bypass valve may be a three-way valve and may preferably include a second housing that is suitably provided at a position at which an air discharge line between a cathode outlet and a humidifier inlet and a branch line communicating with outside air meet each other and are located in a straight line with the first housing, and a second valve plate rotatably provided in the second housing.

In still another preferred embodiment, the drive means may preferably include a drive shaft coaxially coupling the first valve plate in the first housing with the second valve plate in the second housing, a reduction gear that is suitably provided on an end of the drive shaft, and a motor having a drive gear which suitably engages with the reduction gear.

In yet another preferred embodiment, each of the first and second housings may have a cylindrical shape, and each of the first and second valve plates may have a fan shape to suitably rotate along the inner surface of each of the first and second housings.

According to preferred embodiments of the present invention, an air shut-off valve for suitably preventing air from entering a cathode and a dry gas purge bypass valve for removing water are suitably integrated into one module, thus preventing the deterioration of a catalyst in a stack and suitably improving the durability of the stack, improving cold startability through the efficient removal of water, and suitably reducing manufacturing cost by reducing the number of parts required for the valve system.

Accordingly, in preferred embodiments, an integrated valve system of the present invention suitably prevents oxygen from penetrating a cathode by partial pressure when a fuel cell is shut down, and suitably prevents the removal of a catalyst due to the corrosion of the carbon of the cathode resulting from crossover, thus suitably preventing the deterioration of the catalyst in the stack and improving the durability of the stack.

Further, in preferred embodiments, an integrated valve system of the present invention allows only dry air to enter a cathode before a fuel cell is shut down, thus preferably allowing water in the cathode to be smoothly discharged to the outside, and suitably preventing a cell voltage from dropping due to the freezing of remaining water even under conditions below the freezing point, therefore improving cold startability.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is a perspective view of the integrated valve system for the fuel cell stack according to preferred embodiments of the present invention, in which FIG. 2 illustrates preferred positions of valves in a normal operation mode after the fuel cell is started up;

FIG. 4 is a perspective view of the integrated valve system for the fuel cell stack according to preferred embodiments of the present invention, in which FIG. 4 illustrates preferred valve positions at which water is suitably removed from a cathode before the fuel cell is shut down;

Figure 1:
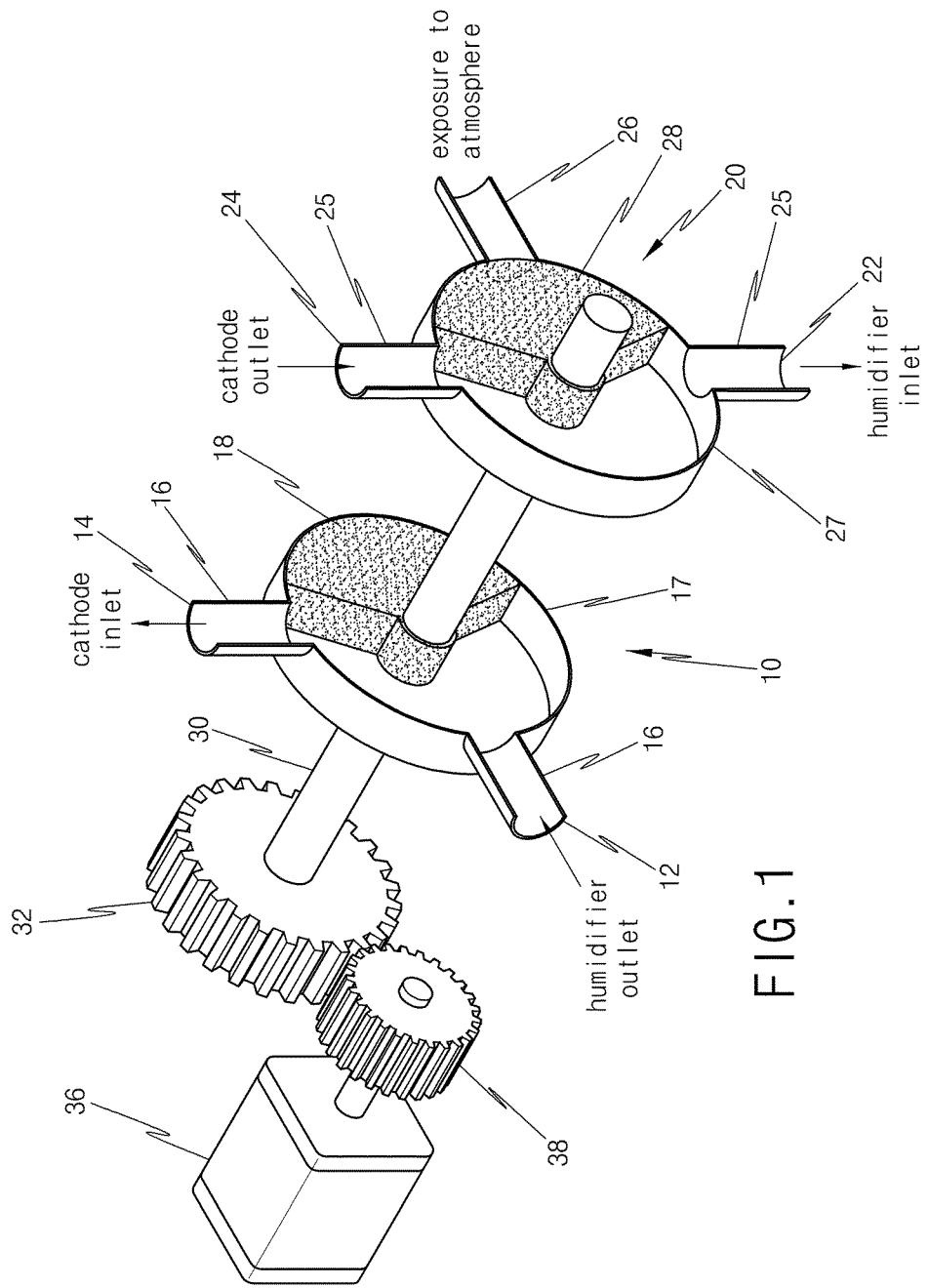
FIG. 1 is a perspective view illustrating an exemplary integrated valve system for a fuel cell stack according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an integrated valve system for a fuel cell stack comprising an air shut-off valve, and a bypass valve, wherein the bypass valve is coaxially coupled to the air shut-off valve into one module so that the bypass valve and the air shut-off valve are opened or closed by a drive means.

In one embodiment, the air shut-off valve is used for preventing air from entering a cathode when a fuel cell is shut down.

In another embodiment, the bypass valve comprises a dry gas purging function to remove water and an air blocking function.

In another further embodiment, the bypass valve and the air shut-off valve are simultaneously opened or closed by a drive means.

In still another embodiment, the air shut-off valve is a two-way valve.

In another further embodiment, the two-way air shut-off valve comprises a first housing provided in an air supply line between a humidifier outlet and a cathode inlet; and a first valve plate rotatably provided in the first housing.

In another embodiment, the air shut-off valve is a three-way valve.

In a further embodiment, the three-way air shut-off valve comprises a second housing provided at a position at which an air discharge line between a cathode outlet and a humidifier inlet and a branch line communicating with outside air meet each other, and located in a straight line with the first housing; and a second valve plate rotatably provided in the second housing.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 7:
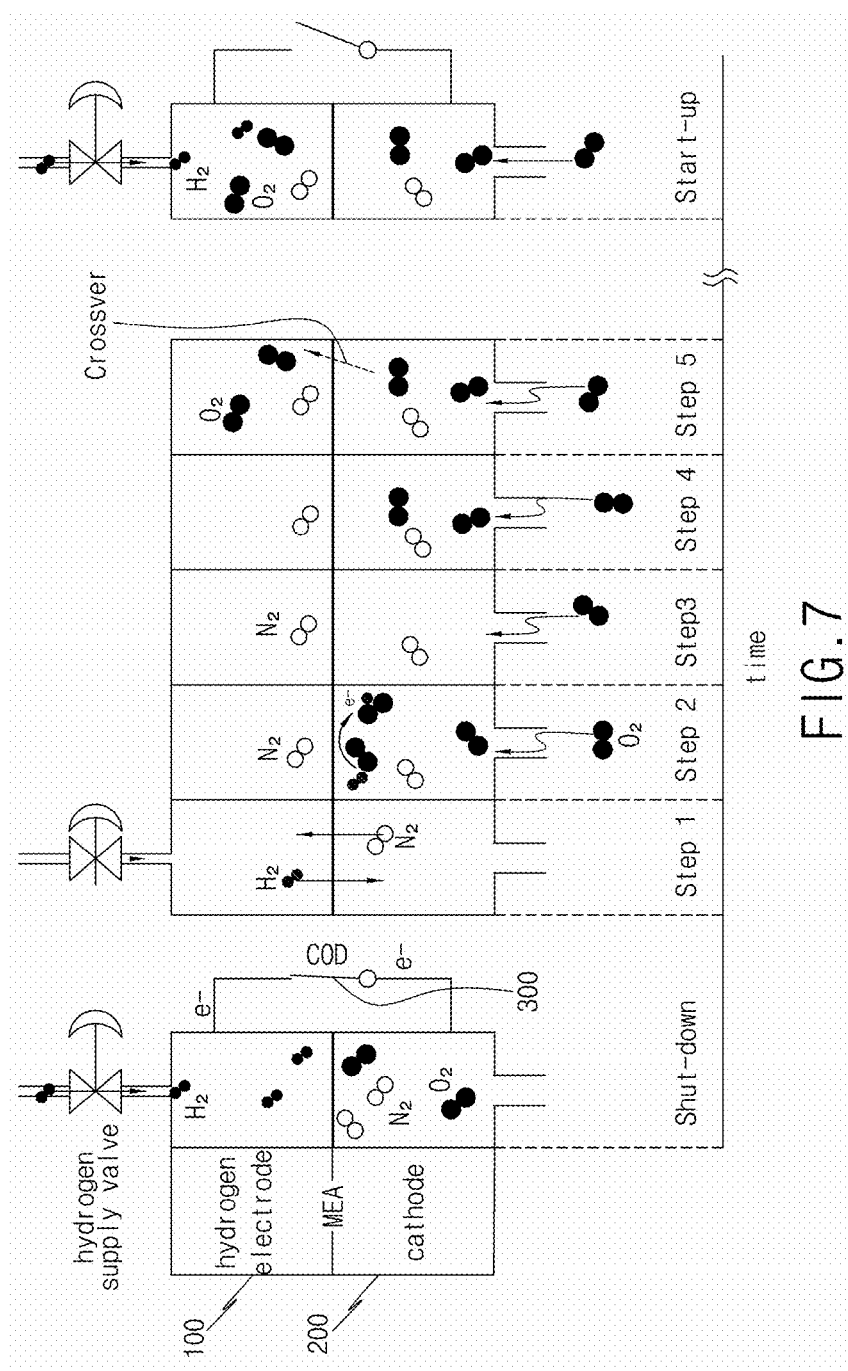
FIGS. 7 and 8 are schematic views illustrating mechanism in which the catalyst deterioration of an electrode occurs in the start-up and shut-down cycles of a fuel cell vehicle.

A mechanism in which the catalyst deterioration of the electrode occurs in the start-up and shut-down cycles of the fuel cell vehicle is described with reference to FIG. 7, for example.

First, when the fuel cell is shut down, hydrogen remaining in an anode (the hydrogen electrode) 100 chemically reacts with air (oxygen and nitrogen) at a cathode 200, so that an open circuit voltage (OCV) is suitably produced. Preferably, the OCV leads to the corrosion of a catalyst supported carbon in the stack and a lowering of the durability of the stack. Accordingly, a cathode oxygen depletion (COD) 300 which is a kind of resister is suitably connected to both terminals of the stack so as to remove the OCV.

A crossover phenomenon wherein oxygen penetrates the cathode by partial pressure and crosses over to the anode takes place.

Figure 8:
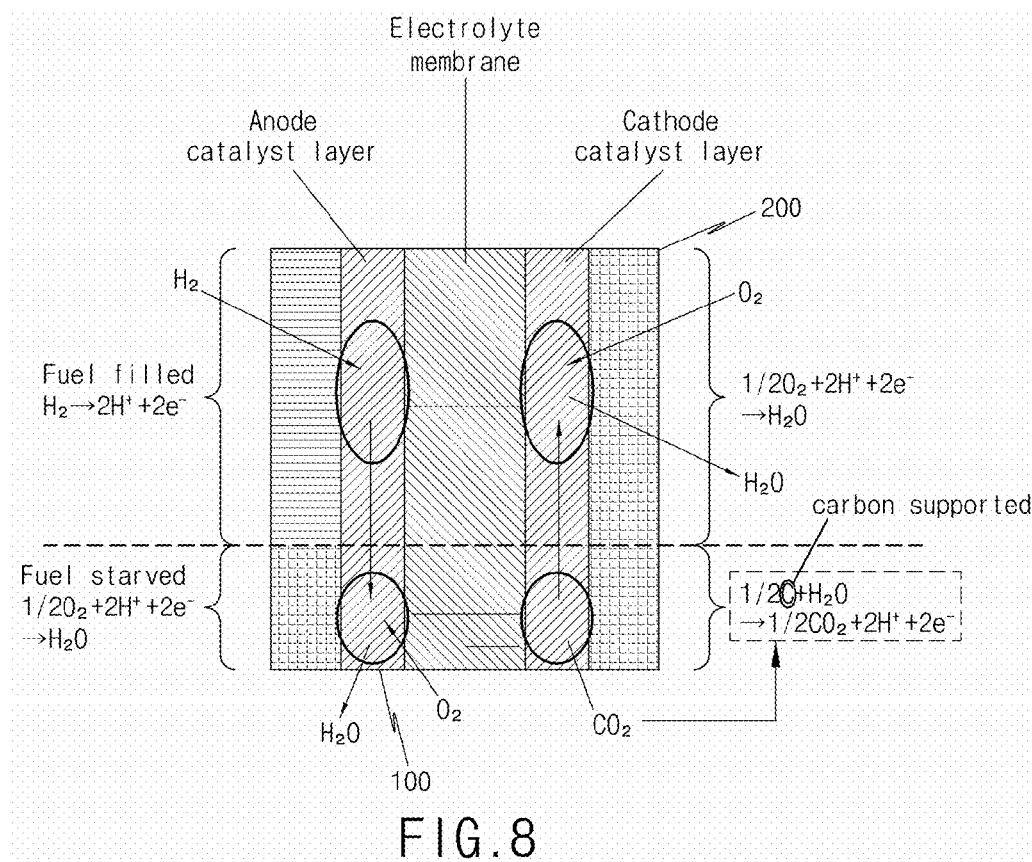
Figure 9:
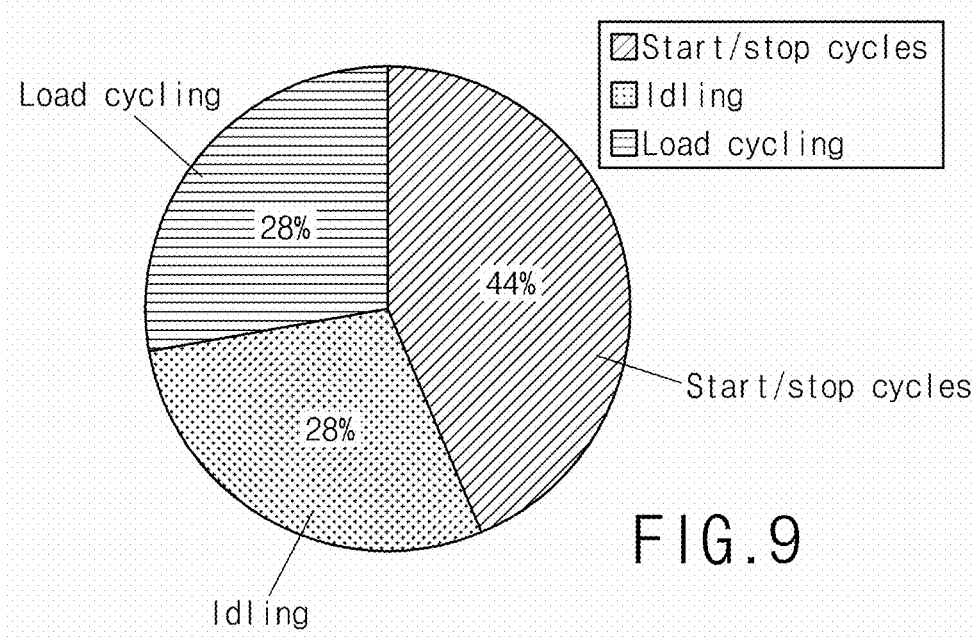
FIG. 9 is a chart illustrating the frequency of catalyst deterioration according to a preferred operation mode of the fuel cell vehicle.

Accordingly, when the fuel cell starts up, reaction for the normal electricity generation of the fuel cell occurs. Further, as shown in FIG. 8, because of the crossover wherein the oxygen crosses the anode 100, water may be abnormally produced in the anode 100, and the removal of the catalyst resulting from supported carbon and carbon corrosion may occur at the outlet side of the cathode 200. Consequently, the performance of the stack is suitably lowered.

Figure 5:
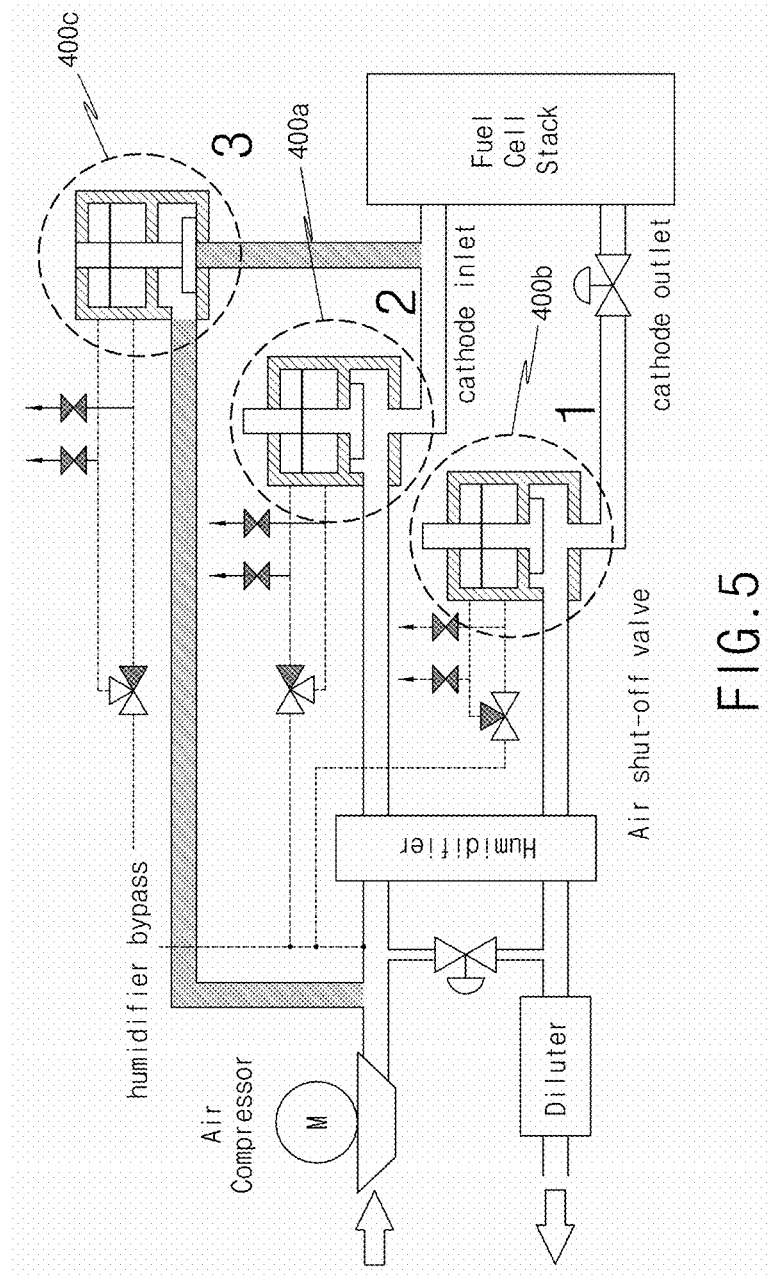
FIG. 5 is a schematic view illustrating the state in which an air shut-off valve and a humidifier bypass valve are separately installed to a conventional fuel cell stack.

To address the above mentioned performance, a configuration as shown in FIG. 5 has been proposed. Referring to the drawing, for example, first and second air shut-off valves 400a and 400b are preferably separately installed at the inlet and outlet of a cathode, thus suitably preventing air (oxygen) causing the catalyst deterioration from penetrating the cathode between the shut-down cycle of the fuel cell and the start-up cycle thereof.

Preferably, in order to easily start up the fuel cell vehicle under conditions below the freezing point, water must be suitably removed from the cathode of the fuel cell stack before the shut-down cycle is performed, to prevent it from freezing. As one method for removing the water, for example, a gas purge method using an air blower has been used. However, discharged water which is purged is suitably re-circulated through a humidifier to the stack, so that water is not perfectly removed.

Figure 6A:
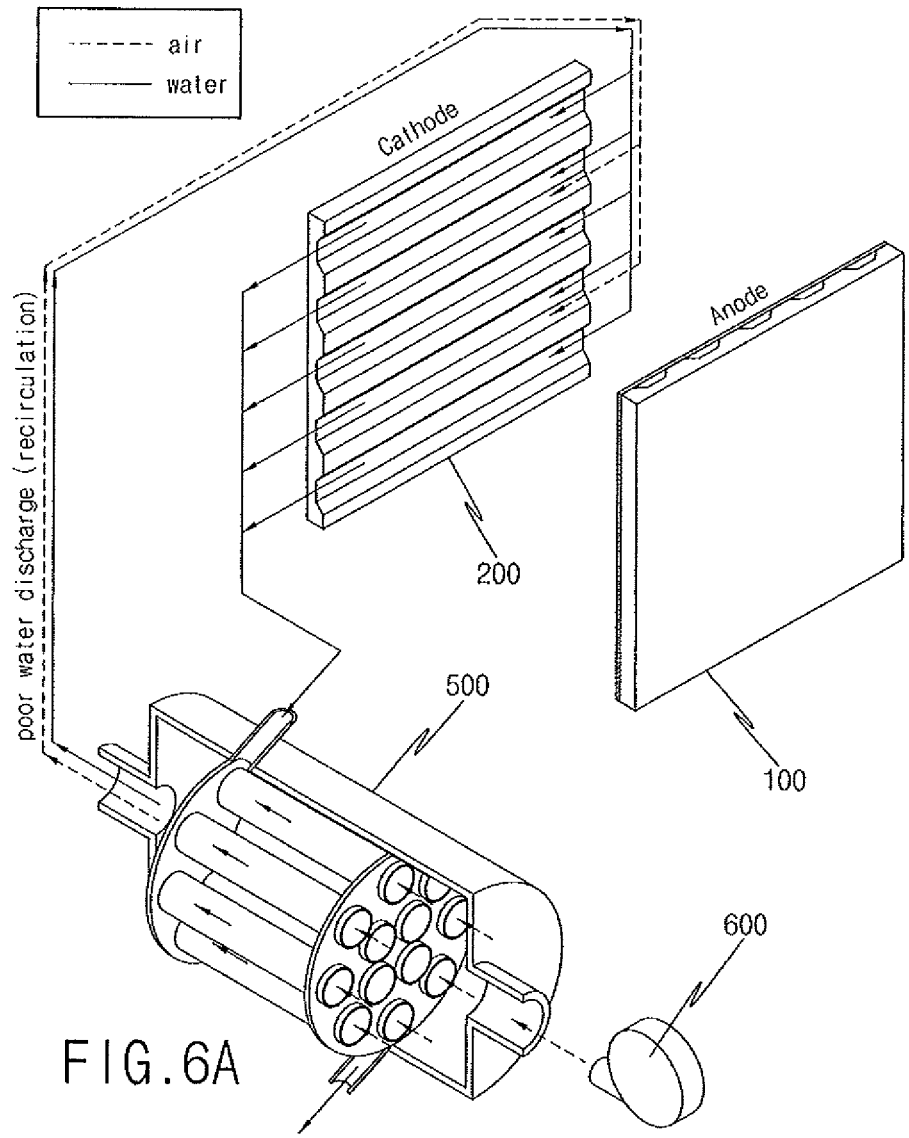
FIGS. 6A and 6B are schematic views illustrating the state in which water is suitably discharged through wet gas purge, and the state in which water is suitably discharged through dry gas purge.
Figure 6B:
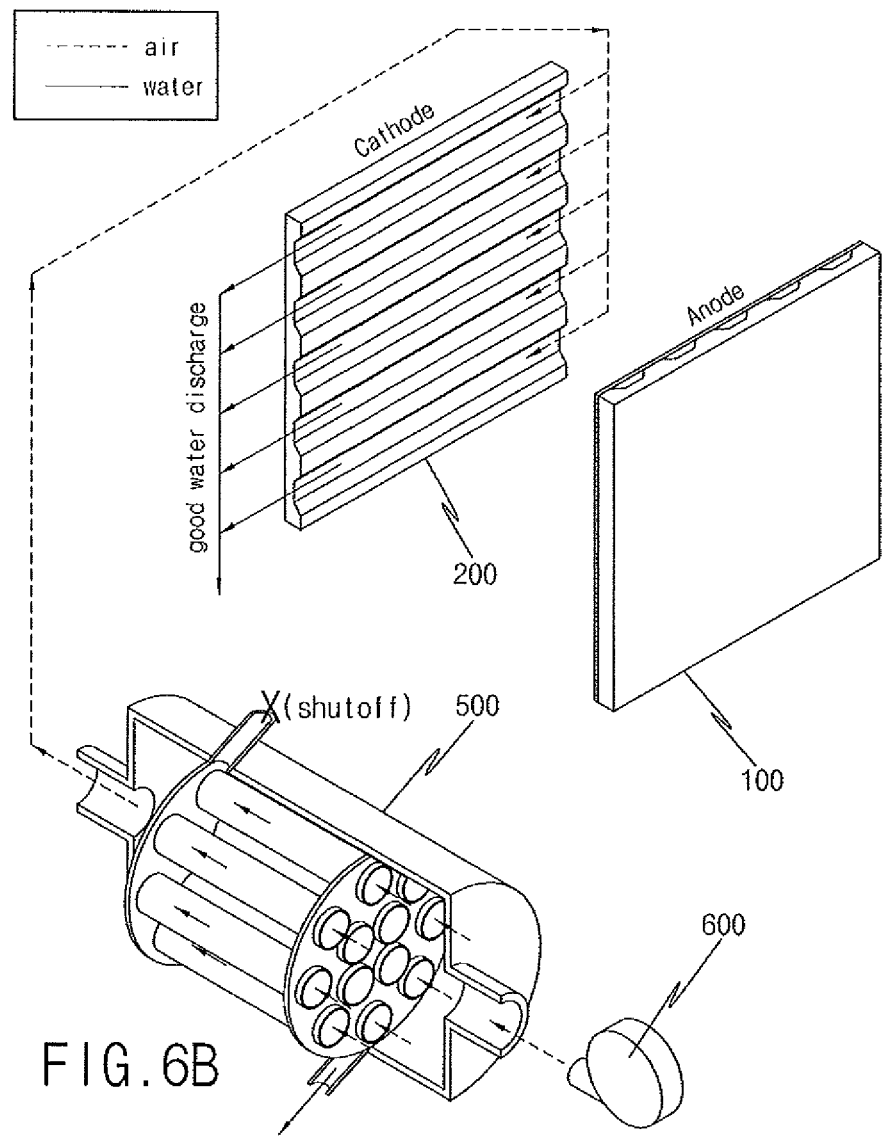
Figure 6C:
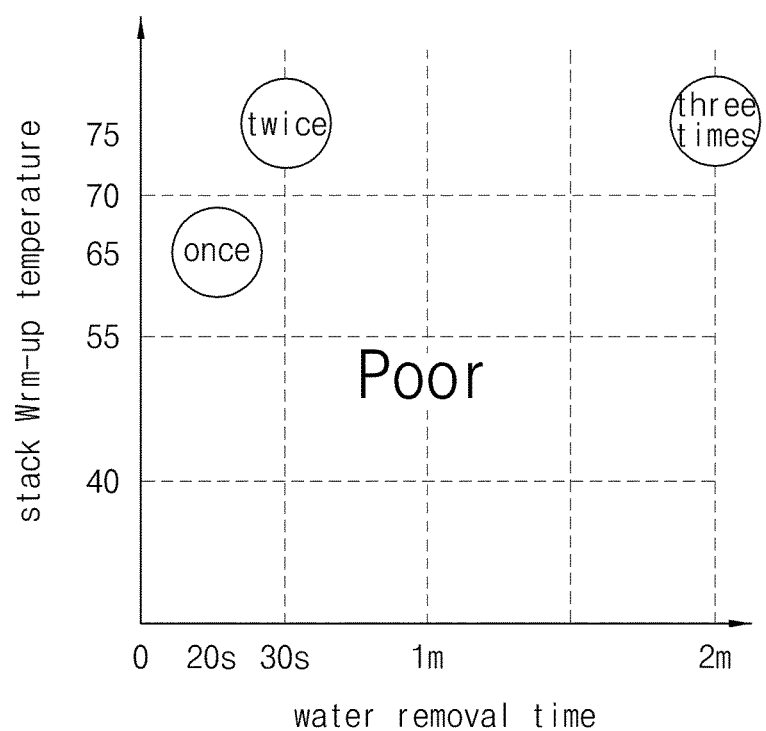
FIGS. 6C and 6D are graphs illustrating the efficiency of water discharge performed through the wet gas purge and the dry gas purge.
Figure 6D:
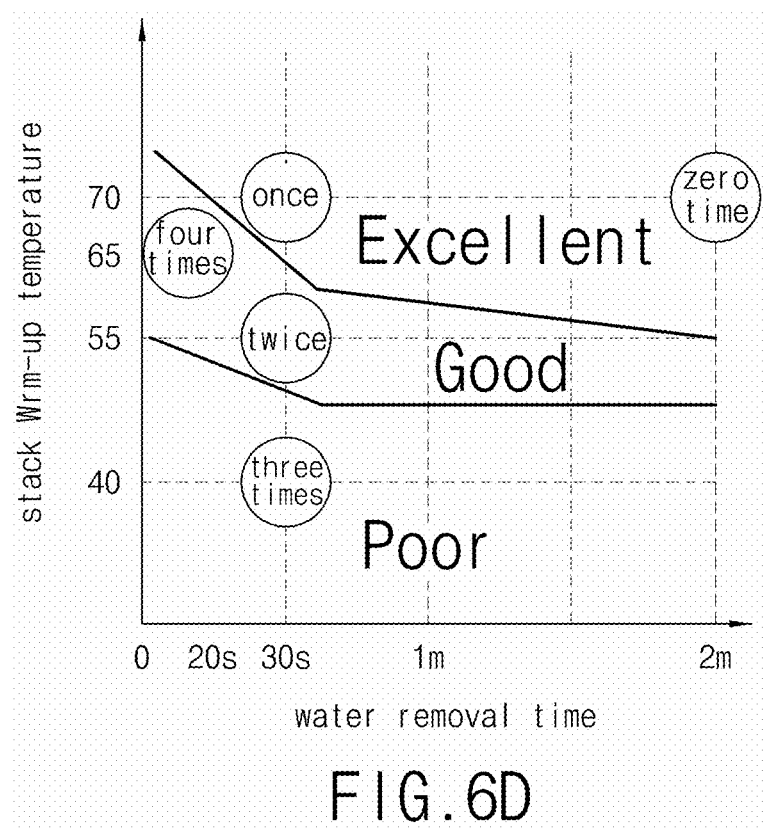

FIGS. 6C and 6D illustrate the test results of a method of purging the wet gas through the humidifier and a dry air purging method of supplying only dry air. As shown in the drawings, according to the method of purging the wet gas through the humidifier, it is difficult to start because of a drop of cell voltage of the fuel cell resulting from the freezing of water remaining in the stack. Conversely, according to the dry air purge method of supplying only dry air, there is no drop of cell voltage resulting from the freezing of water remaining in the stack, so that it is possible to start it. Preferred embodiments of the present invention are described in detail with reference to the accompanying drawings.

FIG. 1 is a perspective view illustrating an integrated valve system for a fuel cell stack according to preferred exemplary embodiments of the present invention.

Preferably, in order to prevent air (oxygen) causing the deterioration of catalyst from entering a cathode between the shut down of a fuel cell to the start up thereof, an air shut-off valve 10 is suitably installed between a humidifier outlet 12 and a cathode inlet 14 of the fuel cell stack, and a bypass valve 20 having a dry gas purge function for suitably removing water from the cathode of the stack and a function for shutting off air to the cathode is suitably installed between a cathode outlet 24 of the stack and a humidifier inlet 22. Preferably, the air shut-off valve 10 and the bypass valve 20 are coaxially coupled into one module to simultaneously open or close.

According to certain preferred embodiments, the air shut-off valve 10 is a two-way valve which is suitably installed in an air supply line 16 between a humidifier outlet 12 and a cathode inlet 14, that is, preferably, a portion of the air supply line 16 which is perpendicularly bent in an L shape. According to certain preferred embodiments, the air shut-off valve 10 preferably includes a first cylindrical housing 17 which is suitably provided in the L-shaped bent portion of the air supply line 16, and a first valve plate 18 which is suitably rotatably installed in the first housing 17 and suitably rotated along the inner surface of the first housing 17.

According to certain preferred embodiments, the bypass valve 20 is a three-way valve which is suitably installed at a position where an air discharge line 25 between a cathode outlet 24 and a humidifier inlet 22 and a branch line 26 branching from the air discharge line 25 to suitably communicate with the outside air meet each other. Preferably, the bypass valve 20 includes a second cylindrical housing 27 which is located in a straight line with the first housing 17 of the air shut-off valve 10, and a second valve plate 28 which is preferably rotatably installed in the second housing 27 and rotated along the inner surface of the second housing 27.

Preferably, the first valve plate 18 of the air shut-off valve 10 and the second valve plate 28 of the bypass valve 20 have fan shapes so that they are easily rotated along the inner surfaces of the first and second cylindrical housings 17 and 27.

According to further preferred embodiments, the first valve plate 18 of the air shut-off valve 10 and the second valve plate 28 of the bypass valve 20 are coaxially coupled to each other and simultaneously rotated to be open or closed. One preferred embodiment of a drive means for performing the rotational opening or closing operation is as follows.

According to an exemplary embodiment, the drive means preferably includes a drive shaft 30 which coaxially couples the vertex of the fan-shaped first valve plate 18 suitably provided in the first housing 17 with the vertex of the fan-shaped second valve plate 28 suitably provided in the second housing 27.

In further preferred embodiments, a reduction gear 32 is suitably mounted to one end of the drive shaft 30 extending from the first housing 17, and engages with a drive gear 38 which is suitably mounted to a shaft of a motor 36.

Accordingly, when the motor 36 is driven, so that the drive gear 38 is rotated, rotating force which is suitably reduced in speed by the reduction gear 32 is transmitted to the drive shaft 30. In further preferred embodiments, as the drive shaft 30 rotates, both the first valve plate 18 and the second valve plate 28 rotate simultaneously, thus suitably performing an opening or closing operation.

An operating example according to certain preferred embodiments wherein the first valve plate of the air shut-off valve and the second valve plate of the bypass valve open or close is described herein.

Figure 2:
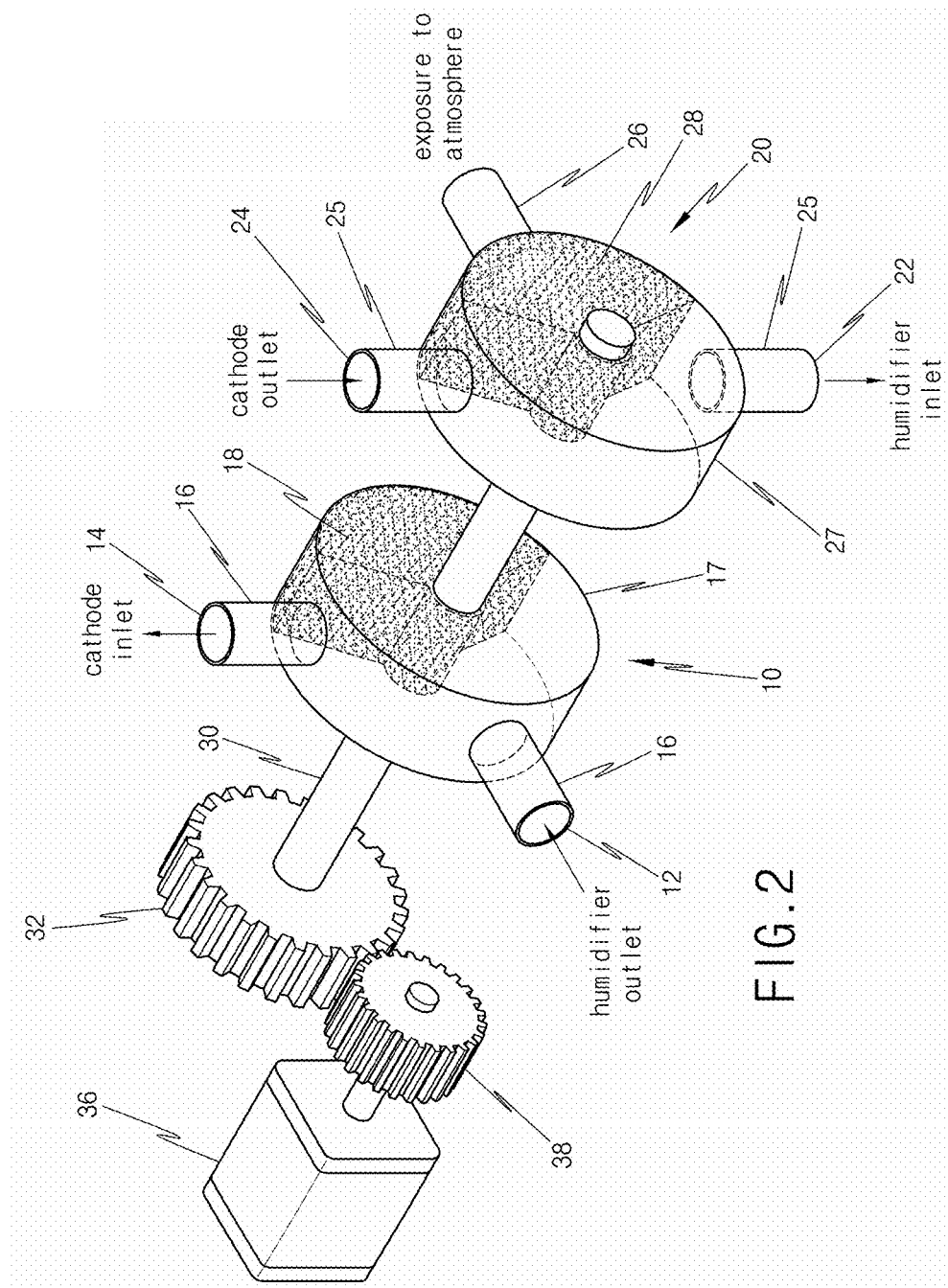

According to certain preferred embodiments and as shown in FIG. 2, FIG. 2 is a perspective view illustrating the state in which the integrated valve system for the fuel cell stack according to the present invention is suitably operated in a normal operation mode after the fuel cell is started up.

Preferably, after the fuel cell is started up, hydrogen and air are normally supplied to the stack so as to normally generate electricity. Preferably, the air supply line 16 between the humidifier outlet 12 and the cathode inlet 14 of the fuel cell stack are kept open, and the air discharge line 25 between the cathode outlet 24 and the humidifier inlet 22 are kept open while the branch line 26 is suitably closed.

Accordingly, the first valve plate 18 that is suitably installed in the first housing 17 of the air supply line 16 is preferably located at an open position (neutral position) at which the humidifier outlet 12 and the cathode inlet 14 suitably communicate with each other. In further preferred embodiments, the second valve plate 28 that is suitably installed in the second housing 27 of the air discharge line 25 is also preferably located at an open position (neutral position) at which the cathode outlet 24 and the humidifier inlet 22 suitably communicate with each other. At this time, the second valve plate 28 closes the branch line 26 which suitably communicates with the outside air.

Accordingly, after the humidifier humidifies air fed from an air blower, the air flows along the air supply line 16 to the cathode of the stack, and suitably reacts with hydrogen of the anode, thus generating electricity.

Preferably, wet air discharged from the cathode outlet 24 of the stack is suitably fed along the air discharge line 25 through the humidifier inlet 22 into the humidifier, thus humidifying dry air fed from the air blower.

Figure 3:
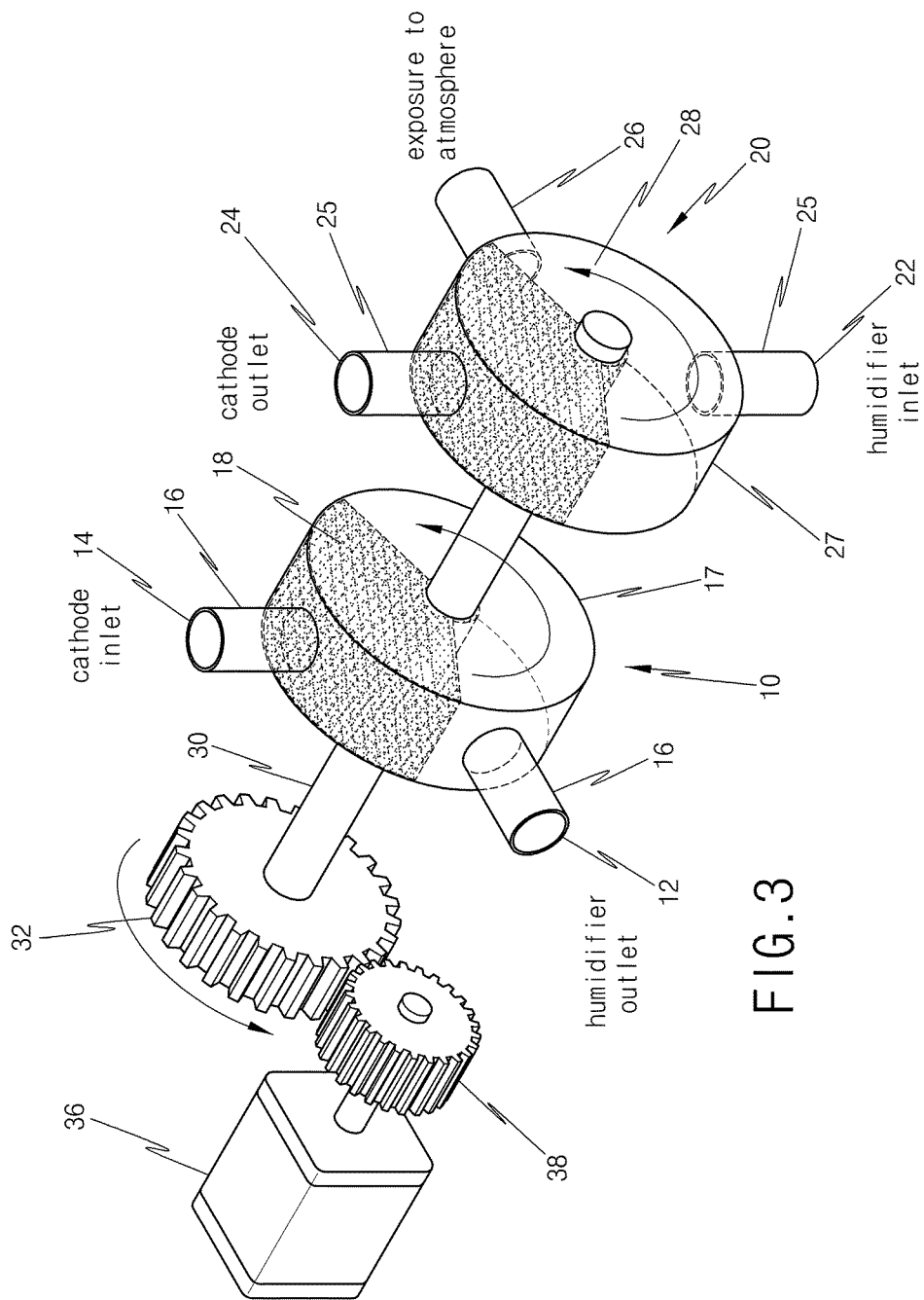
FIG. 3 is a perspective view of the integrated valve system for the fuel cell stack according to preferred embodiments of the present invention, illustrating operating positions of the valves when the fuel cell is shut down.

According to certain preferred embodiments and as shown in FIG. 2, FIG. 3 is a perspective view illustrating an operation state of the integrated valve system for the fuel cell stack according to preferred embodiments of the present invention when the fuel cell is shut down.

Preferably, in order to prevent air (oxygen) causing the catalyst deterioration from entering the cathode between the shut down of the fuel cell to the start up thereof, the air supply line 16 of the fuel cell stack must be kept suitably closed, and the air discharge line 25 between the cathode outlet 24 and the humidifier inlet 22 must also be kept suitably closed.

Accordingly, in further preferred embodiments, the first valve plate 18 installed in the first housing 17 of the air supply line 16 is suitably rotated 90 degrees counterclockwise from the neutral position by the drive means, thus being located at a closure position at which the humidifier outlet 12 and the cathode inlet 14 do not communicate with each other. In further related embodiments, the second valve plate 28 that is suitably installed in the second housing 27 of the air discharge line 25 is also suitably rotated 90 degrees counterclockwise from the neutral position along with the first valve plate 18, thus being located at a closure position at which the cathode outlet 24 and the humidifier inlet 22 do not communicate with each other. Preferably, the second valve plate 28 closes the branch line 26 communicating with the outside air Accordingly, as the humidifier outlet 12 and the cathode inlet 14 are suitably closed by the first valve plate 18, and the cathode outlet 24 and the humidifier inlet 22 are suitably closed by the second valve plate 28, the first and second valve plates 18 and 28 easily prevent oxygen from entering the cathode by partial pressure during a period from the shut down of the fuel cell to the start up thereof, thus preventing crossover from occurring, unlike the prior art. Accordingly, the removal of the catalyst resulting from the carbon corrosion of the cathode due to the crossover can be suitably prevented. Preferably, the deterioration of the catalyst in the stack is suitably prevented and the durability of the stack is suitably improved.

Figure 4:
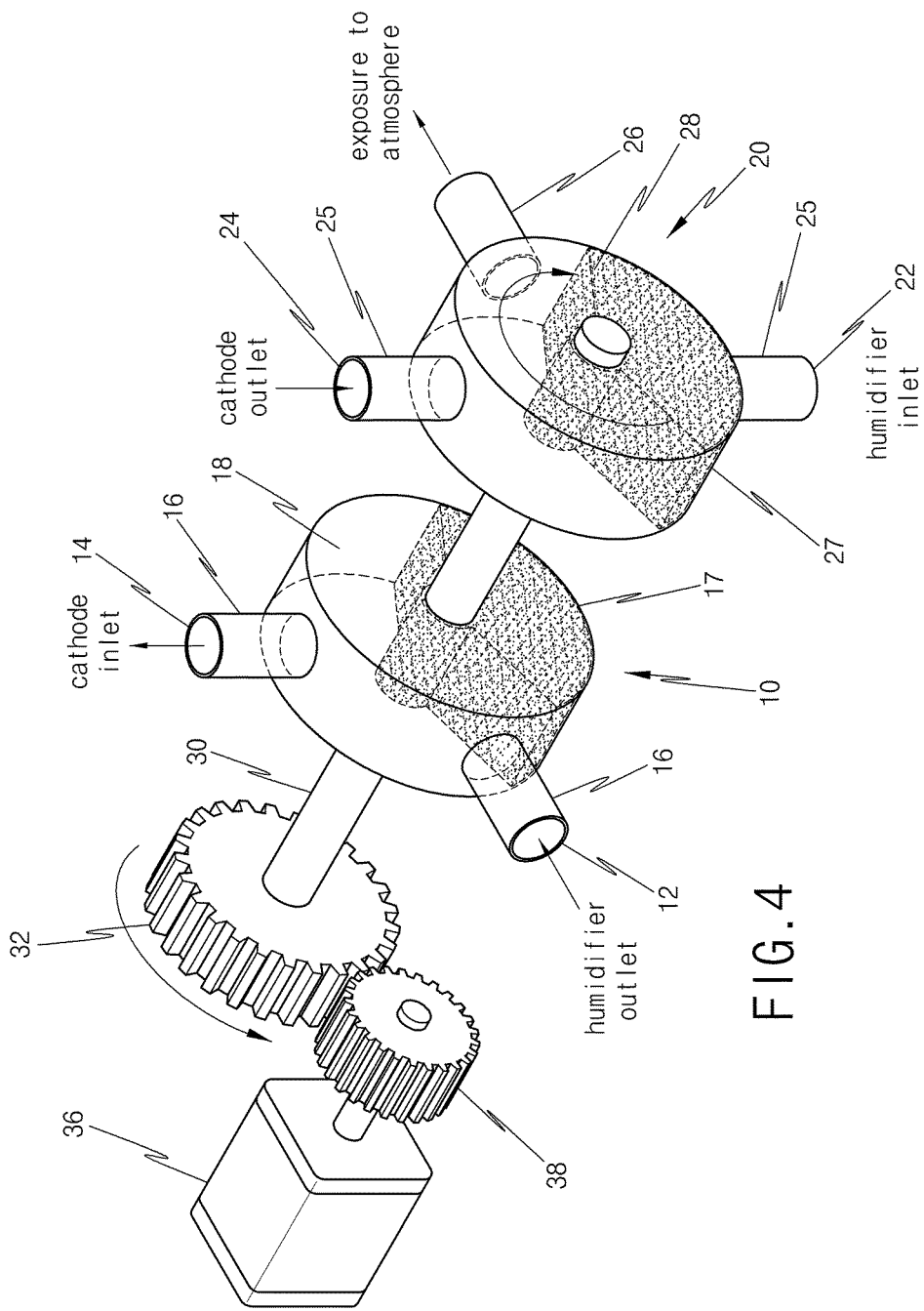

According to certain preferred embodiments and as shown in FIG. 4, FIG. 4 is a view illustrating another exemplary operation example of the integrated valve system for the fuel cell stack according to preferred embodiments of the present invention. That is, FIG. 4 is a perspective view illustrating the state in which water is removed from the cathode of the fuel cell stack before the fuel cell is shut down.

Preferably, in order to easily start up the fuel cell vehicle under conditions below the freezing point, water must be removed from the cathode of the fuel cell stack before the shut-down is performed so that the water does not freeze. Thus, according to preferred embodiments of the present invention, only dry air is supplied to the stack to enable the easy discharge of water.

In a further related embodiment, the first valve plate 18 suitably installed in the first housing 17 of the air supply line 16 is suitably rotated 90 degrees clockwise from the neutral position by the drive means, thus maintaining an open state in which the humidifier outlet 12 and the cathode inlet 14 suitably communicate with each other. Further, the second valve plate 28 suitably installed in the second housing 27 of the air discharge line 25 is rotated 90 degrees clockwise from the neutral position together with the first valve plate 18, thus moving to a position at which the cathode outlet 24 and the branch line 26 suitably communicate with each other while maintaining a closure state in which the cathode outlet 24 and the humidifier inlet 22 are closed relative to each other.

Accordingly, dry air passes from the air blower through the humidifier, but the second valve plate 28 suitably closes the humidifier inlet 22. Accordingly, the dry air passes through the humidifier in which wet air is not received, so that the dry air is suitably maintained in a dry state. In further preferred embodiments, water remaining in the cathode is easily discharged to the cathode outlet 24 by the pressure of the dry air which flows along the air supply line 16 into the cathode of the stack. Preferably, water discharged from the cathode outlet 24 is discharged through the branch line 26 to the outside air.

Preferably, in further embodiments, since the humidifier inlet 22 is suitably closed by the second valve plate 28, wet air does not flow from the cathode outlet to the humidifier, and is suitably discharged through the branch line 26 to the outside.

Accordingly, by the opening or closing operation of the first and second valve plates 18 and 28 according to the present invention, only dry air flows into the cathode so that water is smoothly discharged. Preferably, even under conditions below the freezing point, a drop of cell voltage resulting from the freezing of remaining water does not occur, so that cold startability can be suitably improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated valve system for a fuel cell stack comprising:
   an air shut-off valve including a first housing disposed in an air supply line between a humidifier outlet and a cathode inlet, and a first valve plate rotatably provided in the first housing, the air shut off valve preventing air from entering a cathode when a fuel cell is shut down;
   a bypass valve including a second housing and a second valve plate disposed in the second housing, wherein the second housing is disposed at a position at which an air discharge line between a cathode outlet and the humidifier inlet and a branch line communicating with outside air intersect wherein the bypass valve is coaxially coupled to the air shut-off valve as one module so that the bypass valve and the air shut off valve are simultaneously opened or closed; and
   a drive means that opens and closes the bypass valve and the air shut off valve including:
      a drive shaft coaxially coupling the first valve plate in the first housing with the second valve plate in the second housing,
      a reduction gear disposed on an end of the drive shaft, and
      a motor having a drive gear which engages with the reduction gear.

2. The integrated valve system of claim 1, wherein the air shut-off valve is a two-way valve.

3. The integrated valve system of claim 1, wherein the bypass valve is a three-way valve and the three-way valve removes water and block air.

4. The integrated valve system of claim 1, wherein each of the first and second housings has a cylindrical shape, and each of the first and second valve plates has a fan shape to rotate along an inner surface of each of the first and second housings.

* * * * *